No. 726,104. PATENTED APR. 21, 1903.
R. SCHUMANN.
CATTLE MARK.
APPLICATION FILED DEC. 8, 1902.

NO MODEL.

UNITED STATES PATENT OFFICE.

RICHARD SCHUMANN, OF GREIZ, GERMANY.

CATTLE-MARK.

SPECIFICATION forming part of Letters Patent No. 726,104, dated April 21, 1903.

Application filed December 8, 1902. Serial No. 134,340. (No model.)

*To all whom it may concern:*

Be it known that I, RICHARD SCHUMANN, a subject of the Emperor of Germany, residing at Greiz, Reuss, elder line, Germany, have invented certain new and useful Improvements in Cattle-Marks, of which the following is a specification.

My invention relates to cattle-marks to be applied to the ears of cattle to properly indicate their ownership, and has for its object to provide an improved device of this class which will not be liable to easy displacement and which will give in its application and removal as little pain as possible to the animal.

With this object in view the invention consists in the improved cattle-mark hereinafter fully described and afterward specifically pointed out in the claims.

Figure 1:
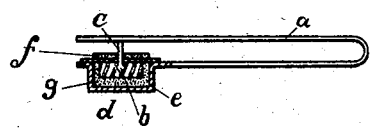
Figure 2:
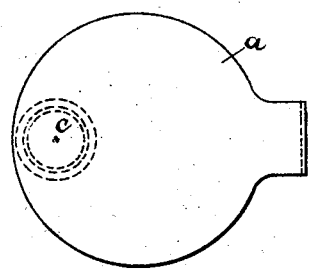
Figure 3:
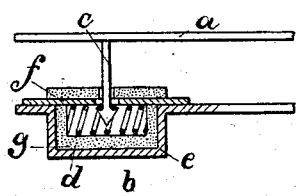
Figure 4:
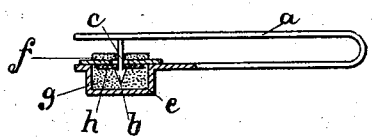

In the accompanying drawings, Figure 1 is a view, partly in section and partly in elevation, of a cattle-mark constructed in accordance with my invention. Fig. 2 is a plan view thereof. Fig. 3 is an enlarged sectional view of the working parts; and Fig. 4 is a view, partly sectional and partly in elevation, illustrating a modification.

Like letters mark the same parts when they occur in more than one figure of the drawings.

$a$ indicates the main body of the mark, consisting of a piece of sheet metal of the form of two disks joined by a neck and bent at the neck to bring the disks into parallelism at a short distance from each other. In one disk is formed, preferably by stamping, a pan or box $e$, in which is placed a cork plate $g$ and a spiral spring $d$, lying parallel with the disk and the bottom of the box. The pan is covered by a metal plate and a cork disk $f$, the metal plate being centrally perforated in line with an arrow-pointed pin $c$, projecting from the inner side of the opposite disk. The owner's name and any other desired marks or letters are formed on the flat disk, whereby the cattle may be recognized.

To apply the mark, the disks are forced apart far enough to permit the ear of the animal to be placed between the point $b$ of the pin and the other disk, and when the ear is thus inserted pressure on the outside of the disks will force the point of the pin through the ear and the cork disk between the coils of the spring and against the plate in the bottom of the pan. The latter will prevent injury of the pin-point by contact with the bottom of the pan, and the wire of the spring will engage the barbed point and prevent its accidental or easy withdrawal.

As a substitute for the spring I may use a disk $h$ of membrane, as shown in Fig. 4, which will permit the head to pierce it and will close over the barbed head to prevent its withdrawal.

Having thus described my invention, what I claim as new, and desire to secure by Letters Patent of the United States, is—

1. A cattle-mark comprising a main body consisting of two disks of sheet metal joined by a neck and bent at the neck into parallelism with each other, a box formed in one body-disk opening inward, an elastic body in the box, a centrally-perforated metal disk covering the box, a cork disk on the metal disk, and a barbed pin projecting inward from the other body-disk in line with the perforation of the metal disk, substantially as described.

2. A cattle-mark comprising a main body consisting of two disks of sheet metal joined by a neck and bent at the neck into parallelism with each other, a box formed in one of said body-disks opening inward, a cork plate in the bottom of the box, a spiral spring in the box parallel with the bottom thereof, a metal disk covering the box and centrally perforated, a cork disk superposed thereon, and a barbed pin projecting inwardly from the opposite body-disk in line with the center of the box, substantially as described.

In testimony whereof I affix my signature.

RICHARD SCHUMANN.

Witnesses:
F. STEPHAN,
A. BRAÜTIGAM.